(12) United States Patent
Eryurek

(10) Patent No.: US 6,954,713 B2
(45) Date of Patent: Oct. 11, 2005

(54) CAVITATION DETECTION IN A PROCESS PLANT

(75) Inventor: Evren Eryurek, Minneapolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 207 days.

(21) Appl. No.: 10/044,154

(22) Filed: Jan. 10, 2002

(65) Prior Publication Data

US 2002/0123856 A1 Sep. 5, 2002

Related U.S. Application Data

(60) Provisional application No. 60/273,164, filed on Mar. 1, 2001.

(51) Int. Cl.[7] .................... G01L 21/02; F01D 17/00; F04B 49/06; G05B 13/04
(52) U.S. Cl. .................... 702/140; 415/1; 417/44.2; 361/160; 700/108; 700/286; 700/287; 706/15
(58) Field of Search .................... 702/33, 34, 59, 702/140, 182, 183, 184, 187, 188; 700/28, 32, 51, 73, 108, 110, 287; 290/43; 415/1; 361/160; 417/44.2; 706/15

(56) References Cited

U.S. PATENT DOCUMENTS

| | | | |
|---|---|---|---|
| 4,527,271 A | 7/1985 | Hallee et al. .................. 371/20 |
| 4,607,325 A | 8/1986 | Horn .......................... 364/151 |
| 4,657,179 A | 4/1987 | Aggers et al. ................ 236/51 |
| 4,734,873 A | 3/1988 | Malloy et al. ............... 364/571 |
| 4,763,243 A | 8/1988 | Barlow et al. .............. 364/200 |
| 4,764,862 A | 8/1988 | Barlow et al. .............. 364/200 |
| 4,885,694 A | 12/1989 | Pray et al. ............. 364/464.01 |
| 4,907,167 A | 3/1990 | Skeirik ........................ 364/500 |
| 4,910,691 A | 3/1990 | Skeirik ........................ 364/513 |
| 4,944,035 A | 7/1990 | Aagardl et al. ............. 364/556 |
| 4,956,793 A | 9/1990 | Bonne et al. ............... 364/558 |
| 4,965,742 A | 10/1990 | Skeirik ........................ 364/513 |
| 5,006,992 A | 4/1991 | Skeirik ........................ 364/513 |
| 5,008,810 A | 4/1991 | Kessel et al. ............... 364/200 |
| 5,015,934 A | 5/1991 | Holley et al. ............... 318/611 |
| 5,018,215 A | 5/1991 | Nasr et al. .................... 382/15 |
| 5,043,863 A | 8/1991 | Bristol et al. ............... 364/165 |
| 5,050,095 A | 9/1991 | Samad ........................ 364/513 |
| 5,070,458 A | 12/1991 | Gilmore et al. ........ 364/424.06 |
| 5,121,467 A | 6/1992 | Skeirik ........................ 395/11 |
| 5,134,574 A | 7/1992 | Beaverstock et al. .. 364/551.01 |
| 5,140,530 A | 8/1992 | Guha et al. ................... 395/13 |
| 5,142,612 A | 8/1992 | Skeirik ........................ 395/11 |
| 5,161,013 A | 11/1992 | Rylander et al. ............ 358/160 |
| 5,161,110 A | * 11/1992 | Dorchak ..................... 700/108 |
| 5,167,009 A | 11/1992 | Skeirik ........................ 395/27 |

(Continued)

FOREIGN PATENT DOCUMENTS

| | | |
|---|---|---|
| DE | 196 45 129 A1 | 5/1998 |
| EP | 0 943 805 A1 | 9/1999 |
| WO | WO 97/21154 A | 6/1997 |

OTHER PUBLICATIONS

Communication Pursuant to Article 96(2) EPC in EPO Application No. 02723219.8 dated Jul. 5, 2004.

(Continued)

*Primary Examiner*—Michael Nghiem
*Assistant Examiner*—John Le
(74) *Attorney, Agent, or Firm*—Marshall, Gerstein & Borun LLP

(57) ABSTRACT

A monitoring system for use in a process plant having a pump or other device capable of undergoing cavitation, uses a characteristic curve, a model and/or process variables, such as indications of a flow rate within the device or a pressure at the input of the device, to detect or predict the occurrence of cavitation within the device. Upon detecting the occurrence of cavitation, the monitoring system may alert a user to the existence of the cavitation, may suggest possible causes of the cavitation and may suggest possible actions to be taken to alleviate the cavitation.

17 Claims, 6 Drawing Sheets

U.S. PATENT DOCUMENTS

| | | | | |
|---|---|---|---|---|
| 5,187,674 | A | 2/1993 | Bonne | 364/558 |
| 5,193,143 | A | 3/1993 | Kaemmerer et al. | 395/51 |
| 5,197,114 | A | 3/1993 | Skeirik | 395/22 |
| 5,212,765 | A | 5/1993 | Skeirik | 395/11 |
| 5,224,203 | A | 6/1993 | Skeirik | 395/22 |
| 5,282,261 | A | 1/1994 | Skeirik | 395/22 |
| 5,284,523 | A | 2/1994 | Badami et al. | 134/18 |
| 5,291,190 | A | 3/1994 | Scarola et al. | 395/825.06 |
| 5,301,101 | A | 4/1994 | MacArthur et al. | 364/156 |
| 5,311,447 | A | 5/1994 | Bonne | 364/509 |
| 5,333,298 | A | 7/1994 | Bland et al. | 395/500 |
| 5,351,184 | A | 9/1994 | Lu et al. | 364/165 |
| 5,353,207 | A | 10/1994 | Keeler et al. | 364/164 |
| 5,369,599 | A | 11/1994 | Sadjadi et al. | 364/516 |
| 5,373,452 | A | 12/1994 | Guha | 364/550 |
| 5,384,698 | A | 1/1995 | Jelinek | 364/149 |
| 5,390,326 | A | 2/1995 | Shah | 395/575 |
| 5,396,415 | A | 3/1995 | Konar et al. | 364/162 |
| 5,398,303 | A | 3/1995 | Tanaka | 395/51 |
| 5,408,406 | A | 4/1995 | Mathur et al. | 364/163 |
| 5,442,544 | A | 8/1995 | Jelinek | 364/149 |
| 5,486,920 | A | 1/1996 | Killpatrick et al. | 356/350 |
| 5,486,996 | A | 1/1996 | Samad et al. | 364/152 |
| 5,488,697 | A | 1/1996 | Kaemmerer et al. | 395/51 |
| 5,537,310 | A | 7/1996 | Tanake et al. | 364/151 |
| 5,541,833 | A | 7/1996 | Bristol et al. | 364/165 |
| 5,546,301 | A | 8/1996 | Agrawal et al. | 364/140 |
| 5,559,690 | A | 9/1996 | Keeler et al. | 364/164 |
| 5,561,599 | A | 10/1996 | Lu | 364/164 |
| 5,566,065 | A | 10/1996 | Hansen et al. | 364/164 |
| 5,570,282 | A | 10/1996 | Hansen et al. | 364/148 |
| 5,572,420 | A | 11/1996 | Lu | 364/153 |
| 5,573,032 | A | 11/1996 | Lenz et al. | 137/486 |
| 5,574,638 | A | 11/1996 | Lu | 364/165 |
| 5,596,704 | A | 1/1997 | Geddes et al. | 395/326 |
| 5,640,491 | A | 6/1997 | Bhat et al. | 395/22 |
| 5,646,539 | A | 7/1997 | Codina et al. | 324/678 |
| 5,666,297 | A | 9/1997 | Britt et al. | 364/578 |
| 5,680,409 | A | 10/1997 | Qin et al. | 371/48 |
| 5,687,090 | A | 11/1997 | Chen et al. | 364/496 |
| 5,692,158 | A | 11/1997 | Degeneff et al. | 395/500 |
| 5,704,011 | A | 12/1997 | Hansen et al. | 395/22 |
| 5,715,158 | A | 2/1998 | Chen | 364/150 |
| 5,729,661 | A | 3/1998 | Keeler et al. | 395/213 |
| 5,740,324 | A | 4/1998 | Mathur et al. | 395/22 |
| 5,742,513 | A | 4/1998 | Bouhenguel et al. | 364/492 |
| 5,754,446 | A * | 5/1998 | Fisher et al. | 700/287 |
| 5,761,518 | A | 6/1998 | Boehling et al. | 395/821 |
| 5,764,891 | A | 6/1998 | Warrior | 395/200.2 |
| 5,777,872 | A | 7/1998 | He | 364/149 |
| 5,781,432 | A | 7/1998 | Keeler et al. | 364/164 |
| 5,790,898 | A | 8/1998 | Kishima et al. | 395/899 |
| 5,796,609 | A | 8/1998 | Tao et al. | 364/164 |
| 5,798,939 | A | 8/1998 | Ochoa et al. | 364/493 |
| 5,805,442 | A | 9/1998 | Crater et al. | 364/138 |
| 5,809,490 | A | 9/1998 | Guiver et al. | 706/16 |
| 5,819,050 | A | 10/1998 | Boehling et al. | 395/284 |
| 5,819,232 | A | 10/1998 | Shipman | 705/8 |
| 5,825,645 | A | 10/1998 | Konar et al. | 364/148 |
| 5,826,249 | A | 10/1998 | Skeirik | 706/25 |
| 5,842,189 | A | 11/1998 | Keeler et al. | 706/16 |
| 5,846,056 | A * | 12/1998 | Dhindsa et al. | 417/44.2 |
| 5,847,952 | A | 12/1998 | Samad | 364/148 |
| 5,859,773 | A | 1/1999 | Keeler et al. | 364/164 |
| 5,859,964 | A | 1/1999 | Wang et al. | 395/185.01 |
| 5,864,183 | A * | 1/1999 | Fisher et al. | 290/43 |
| 5,877,954 | A | 3/1999 | Klimasauskas et al. | 364/149 |
| 5,892,679 | A | 4/1999 | He | 364/149 |
| 5,892,939 | A | 4/1999 | Call et al. | 395/500 |
| 5,898,869 | A | 4/1999 | Anderson | 395/652 |
| 5,901,058 | A | 5/1999 | Steinman et al. | 364/130 |
| 5,905,989 | A | 5/1999 | Biggs | 707/1 |
| 5,907,701 | A | 5/1999 | Hanson | 395/671 |
| 5,909,370 | A | 6/1999 | Lynch | 364/148.05 |
| 5,909,541 | A | 6/1999 | Sampson et al. | 395/182.04 |
| 5,909,586 | A | 6/1999 | Anderson | 395/750.08 |
| 5,917,840 | A | 6/1999 | Cheney et al. | 371/53 |
| 5,918,233 | A | 6/1999 | La Chance et al. | 707/104 |
| 5,924,086 | A | 7/1999 | Mathur et al. | 706/25 |
| 5,940,290 | A | 8/1999 | Dixon | 364/138 |
| 5,948,101 | A | 9/1999 | David et al. | 713/2 |
| 5,949,417 | A | 9/1999 | Calder | 345/342 |
| 5,960,214 | A | 9/1999 | Sharpe, Jr. et al. | 395/835 |
| 5,960,441 | A | 9/1999 | Bland et al. | 707/104 |
| 5,975,737 | A | 11/1999 | Crater et al. | 364/138 |
| 5,984,502 | A | 11/1999 | Calder | 364/188 |
| 5,988,847 | A | 11/1999 | McLaughlin et al. | 364/138 |
| 6,008,985 | A | 12/1999 | Lake et al. | 361/686 |
| 6,017,143 | A | 1/2000 | Eryurek et al. | 364/148.06 |
| 6,033,257 | A | 3/2000 | Lake et al. | 439/502 |
| 6,041,263 | A | 3/2000 | Boston et al. | 700/32 |
| 6,047,221 | A | 4/2000 | Piche et al. | 700/44 |
| 6,055,483 | A | 4/2000 | Lu | 702/31 |
| 6,061,603 | A | 5/2000 | Papadopoulos et al. | 700/83 |
| 6,067,505 | A | 5/2000 | Bonoyer et al. | 702/85 |
| 6,076,124 | A | 6/2000 | Korowitz et al. | 710/102 |
| 6,078,843 | A | 6/2000 | Shavit | 700/48 |
| 6,093,211 | A | 7/2000 | Hamielec et al. | 703/12 |
| 6,106,785 | A | 8/2000 | Havlena et al. | 422/109 |
| 6,108,616 | A | 8/2000 | Borchers et al. | 702/183 |
| 6,110,214 | A | 8/2000 | Klimasauskas | 703/2 |
| 6,122,555 | A | 9/2000 | Lu | 700/9 |
| 6,128,279 | A | 10/2000 | O'Neil et al. | 370/229 |
| 6,152,684 | A | 11/2000 | Ferme et al. | 415/1 |
| 6,208,497 | B1 * | 3/2001 | Seale et al. | 361/160 |
| 6,266,726 | B1 | 7/2001 | Nixon et al. | 710/105 |
| 6,298,377 | B1 | 10/2001 | Hartikainen et al. | 709/223 |
| 6,298,454 | B1 | 10/2001 | Schleiss et al. | 714/37 |
| 6,317,701 | B1 | 11/2001 | Pyöä tsia et al. | 702/188 |
| 6,332,110 | B1 | 12/2001 | Wolfe | 702/22 |
| 6,421,571 | B1 | 7/2002 | Spriggs et al. | 700/83 |
| 6,490,506 | B1 * | 12/2002 | March | 700/286 |
| 6,757,665 | B1 * | 6/2004 | Unsworth et al. | 706/15 |

OTHER PUBLICATIONS

U.S. Appl. No. 09/707,580 entitled "Integrated Alarm Display in a Process Control Network", which was filed on Nov. 7, 2000.

U.S. Appl. No. 09/499,445 entitled "Diagnoatic Expert in a Process Control System", which was filed Feb. 7, 2000.

U.S. Appl. No. 09/303,869, filed May 3, 1999.

U.S. Appl. No. 09/257,896, filed Feb. 25, 1999.

U.S. Appl. No. 09/593,327, filed Jun. 14, 2000.

U.S. Appl. No. 09/412,078, filed Oct. 4, 1999.

S. Yedidiah, Centrifugal Pump User's Guidebook, Chapman & Hall, 1996.

M.W. Volk, Pump Characteristics and applications, Marcel Dekker, Inc., 1996.

V.S. Lobanoff and R.R. Ross, Centrifugal Pumps Design and Application, $2^{nd}$ Edition, gulf publishing, 1992.

PCT International Search Report in PCT/US 02/05384 issued, Aug. 21, 2002.

* cited by examiner

CAVITATION DETECTION IN A PROCESS PLANT

RELATED APPLICATION

This is a regularly filed application based on and claiming priority from Provisional Application 60/273,164, filed Mar. 1, 2001 entitled "Asset Utilization Expert in a Process Control Plant."

FIELD OF THE INVENTION

The present invention relates generally to process control systems within process plants and, more particularly, to the use of a coordinated monitoring system to aid in the detection of cavitation in a process control plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, pumps, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Rosemount, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant.

However, in the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Because, for the most part, the very different applications used to perform the different functions within a plant, e.g., process control operations, maintenance operations and business operations are separated, the different applications used for these different tasks are not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process. However, in the past, because these functions were separated, the information generated or collected in one functional area was not used at all, or not used very well in other functional areas which led to an overall sub-optimal use of the assets within process plants.

SUMMARY

A process control system may use an asset utilization expert to collect data or information pertaining to the assets of a process plant from various sources or functional areas of the plant including, for example, the process control functional areas, the maintenance functional areas and the business systems functional areas and uses this information to detect and possibly take corrective actions. In one example, a monitoring system is configured to detect or predict cavitations within equipment, such as pumps, within a plant. In this example, process variable or operational parameter data, such as measured flow rates and pressures, may be combined with maintenance data, such as characteristic curves, to detect or predict cavitation within a pump or other device. Similarly, process data and pump manufacturing data may be combined with process or device models to detect the existence of or likely formation of cavitation within a device.

DETAILED DESCRIPTION

Figure 1:
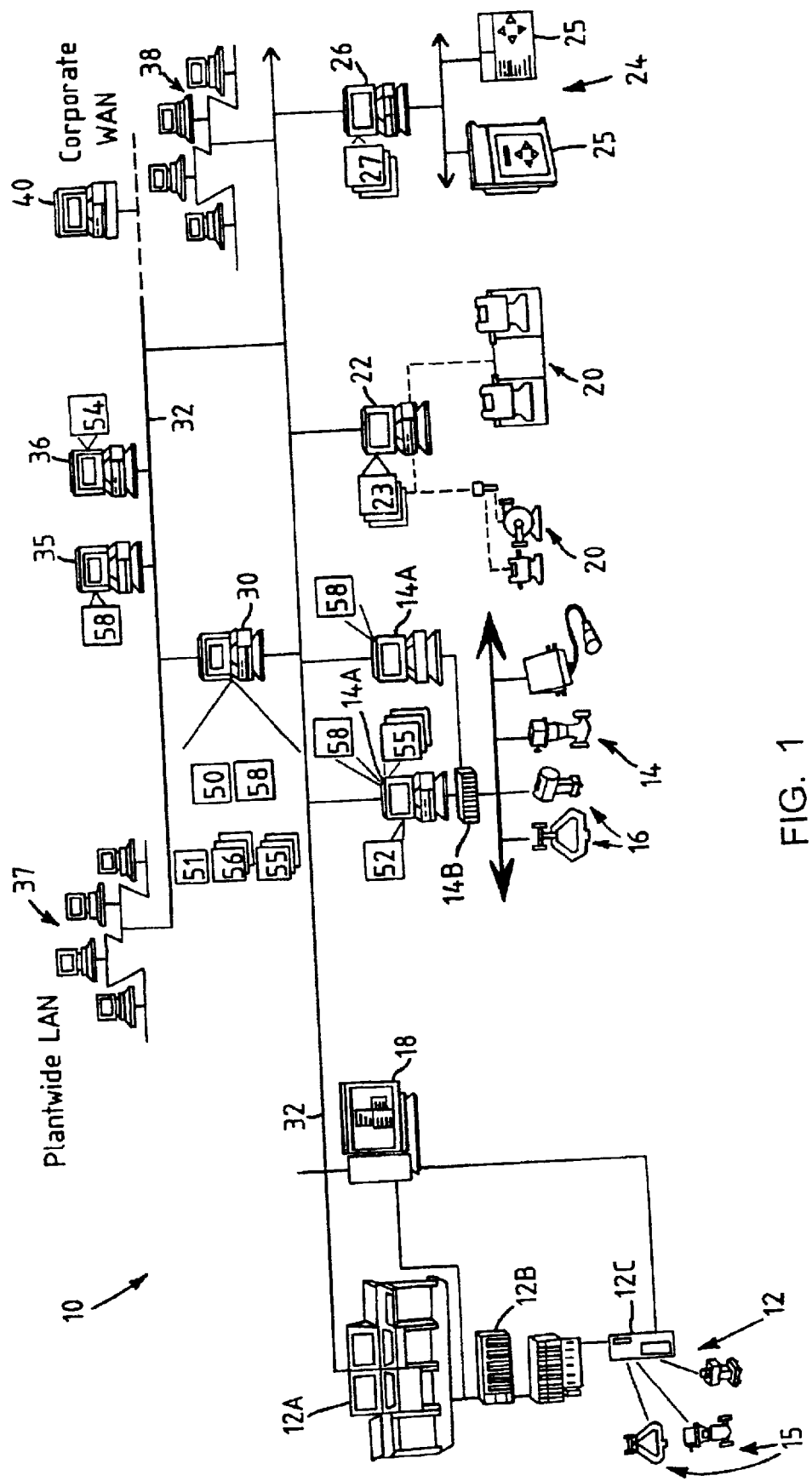
FIG. 1 is a block diagram of a process control plant having an asset utilization expert configured to receive and coordinate data transfer between many functional areas of the plant.

Referring now to FIG. 1, a process control plant 10 includes a number of business and other computer systems interconnected with a number of control and maintenance systems by one or more communication networks. The process control plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process control plant 10 also includes various rotating equipment 20, such as turbines, motors, pumps, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 such as, for example, RBMware provided by CSi Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25.

In the past, the various process control systems 12 and 14 and the power generating and maintenance systems 22 and 26 have not been interconnected with each other in a manner that enables them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there has been little or no meaningful data sharing between the different functional systems within the plant 10.

To overcome this problem, a computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated with to a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. Importantly, the asset utilization expert 50 operates as a data and information clearinghouse in the process plant 10 and is able to coordinate the distribution of data or information from one functional area, such as the maintenance area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process control plant 10.

In particular, the asset utilization expert 50 may include or execute index generation software 51 that creates indexes associated with devices, like process control and instrumentation devices, power generation devices, rotating equipment, units, areas, etc, or that are associated with process control entities, like loops, etc. within the plant 10. These indexes can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

In one embodiment, the control expert 52 may be, for example, the control expert described in U.S. patent application Ser. Nos. 09/256,585 and 09/499,445 identified above. However, these control experts may additionally incorporate and use data related to the status of devices or other hardware within the process control plant 10 in the decision making performed by these control experts. In particular, in the past, the software control experts generally only used process variable data and some limited device status data to make decisions or recommendations to the process operator. With the communication provided by the asset utilization expert 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization expert 50 can provide information pertaining to states of devices and the operation of the control activities within the plant 10 to the business systems 35 and 36 where, for example, a work order generation application or program 54 can automatically generate work orders and order parts based on detected problems within the plant 10 or where supplies can be ordered based on work being performed. Similarly, changes in the control system detected by the asset utilization expert 50 may cause the business systems 35 or 36 to run applications that perform scheduling and supply orders using, for example, the program 54. In the same manner, changes in customer orders etc. can be entered into the business systems 35 or 36 and this data can be sent to the asset utilization expert 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset utilization expert 50.

Moreover, the asset utilization expert 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefor could be sent by the asset utilization expert 50. If desired, the plant 10 may also include models 56 that model certain aspects of the plant 10 and these models 56 can be executed by the asset utilization expert 50 or a control or other expert such as the control expert 52 to perform modeling functions, the purpose of which will be described in more detail herein. Generally speaking, however, the models 56 can be used to determine device, area, unit, loop, etc. parameters, to detect faulty sensors or other faulty equipment, as part of optimizer routines 55, to generate indexes such as performance and utilization indexes for use in the plant 10, to perform performance or condition monitoring, as well as for many other uses. The models 56 may be models such as those created by and sold by MDC Technology located in Teeside, England or may be any other desired types of models. There are, of course, many other applications that can be provided within the plant 10 and that can use the data from the asset utilization expert 50 and the system described herein is not limited to the applications specifically mentioned herein. Overall, however, the asset utilization expert 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization expert 50 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indexes created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs, or as generated by the models in conjunction with the asset utilization expert 50. Of course, the user interface routine 58 may provide any user access to and enable the user to change preferences or other variables used in any or all functional areas of the plant 10.

Figure 2:
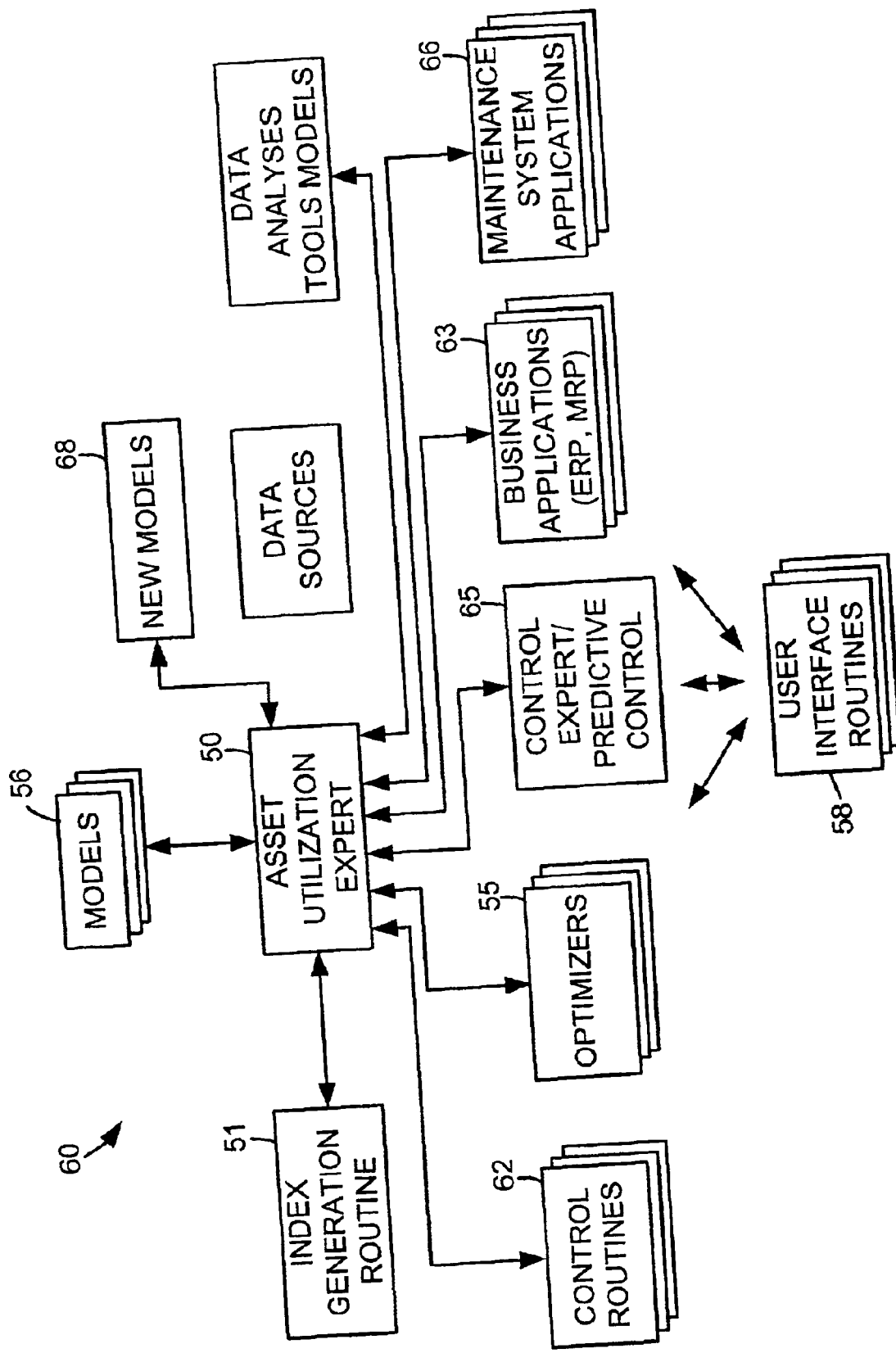
FIG. 2 is a data and information flow diagram with respect to the asset utilization expert within the plant of FIG. 1.

Referring now to FIG. 2, a data flow diagram illustrating some of the data flow between the asset utilization expert 50 and other computer tools or applications within the process plant 10 is provided. In particular, the asset utilization expert 50 may receive information from numerous data collectors or data sources such as multiplexers, transmitters, sensors, hand held devices, control systems, radio frequency (RF) transceivers, on-line control systems, web servers, historians, control modules or other control applications within the process control plant 10, interfaces such as user interfaces and I/O interfaces as well as data servers such as buses (e.g., Fieldbus, HART and Ethernet buses), valves, transceivers, sensors, servers and controllers and other plant assets such as process instrumentation, rotating equipment, electrical equipment, power generation equipment, etc. This data can take on any desired form based on how the data is generated or used by other functional systems. Still further, this data may be sent to the asset utilization expert 50 using any desired or appropriate data communication protocol and communication hardware such as the XML protocol discussed above. Generally speaking, however, the plant 10 may be configured so that the asset utilization expert 50 automatically receives specific kinds of data from one or more of the data sources and so that the asset utilization expert 50 can take predetermined actions with respect to that data.

Also, the asset utilization expert 50 receives information from (and may actually execute) data analysis tools such as typical maintenance data analysis tools which are currently provided today, performance tracking tools, such as those associated with devices, as well as performance tracking tools for process control systems like that described in U.S. patent application Ser. Nos. 09/256,585 and 09/499,445 identified above. The data analysis tools may also include, for example, a root cause application which detects root causes of certain types of problems, event detection such as that described in U.S. Pat. No. 6,017,143, regulatory loop diagnostics such as that disclosed in U.S. patent application Ser. No. 09/303,869 (filed May 3, 1999), which is hereby expressly incorporated by reference herein, impulse lines plugging detection applications, such as that described in U.S. patent application Ser. No. 09/257,896 (filed Feb. 25, 1999), which is hereby expressly incorporated by reference herein, other plugged line detection applications, device status applications, device configuration applications and maintenance applications, device storage, historian and information display tools, such as AMS, Explorer applications and audit trail applications. Still further, the expert 50 can receive data and any information from process control data analysis tools such as the advanced control expert 52, model predictive control process routines such as those described in U.S. patent application Ser. Nos. 09/593,327 (filed Jun. 14, 2000) and 09/412,078 (filed Oct. 4, 1999), which are hereby expressly incorporated by reference herein, tuning routines, fuzzy logic control routines and neural network control routines, as well as from virtual sensors such as that described in U.S. Pat. No. 5,680,409, which may be provided within the process control system 10. Still further, the asset utilization expert 50 may receive information from data analysis tools related to rotating equipment such as on-line vibration, RF wireless sensors and hand-held data collection units, oil analysis associated with rotating equipment, thermography, ultra-sonic systems and laser alignment and balancing systems, all of which may be related to detecting problems or the status of rotating equipment within the process control plant 10. These tools are currently known in the art and so will not be described further herein. Still further, the asset utilization expert 50 may receive data related to power management and power equipment and supplies such as the applications 23 and 27 of FIG. 1, which may include any desired power management and power equipment monitoring and analysis tools.

In one embodiment, the asset utilization expert 50 executes or oversees the execution of mathematical software models 56 of some or all of the equipment within the plant 10, such as device models, loops models, unit models, area models, etc., which are run by, for example, the computer 30 or any other desired computer within process plant 10. The asset utilization expert 50 may use the data developed by or associated with these models for a number of reasons. Some of this data (or the models themselves) may be used to provide virtual sensors within the plant 10. Likewise, some of this data, or the models themselves, may be used to implement predictive control or real time optimal control within the plant 10.

The asset utilization expert 50 receives data as it is generated or at certain periodic times over, for example, the bus 32 or other any communication network within the process control plant 10. Thereafter, periodically or as needed, the asset utilization expert 50 redistributes the data to other applications or uses that data to generate and provide other information useful in different aspects of the control or operation of the process plant 10 to other function systems within the plant 10. The asset utilization expert 50 may also provide data to and receive data from control routines 62 which may be located in process controllers or interfaces associated with those controllers, optimizers 55, business applications 63, maintenance applications 66, etc.

Furthermore, a control expert 65 (which may include a predictive process controller), which in the past simply assumed that the devices it was controlling either worked properly or not at all, can receive information from the asset utilization expert 50 related to the status or health of the devices it is controlling, such as the utilization, variability, health or performance information or other information related to the operating status of devices, loops, etc. which can be taken into account when trying to control a process. The predictive controller 65, as well as the optimizers 55 may provide additional information and data to user interface routines 58. The predictive controller 65 or optimizer 55 may use the status information pertaining to actual current status of the devices in the network, as well as take into account goals and future needs such as those identified by business solution software provided from the asset utilization expert 50 as defined by, for example, business applications 63, to optimize control based on predictions within the control system.

Still further, the asset utilization expert 50 may provide data to and receive data from enterprise resource planning tools such as those typically used in business solutions or business computers 35 and 36. These applications may include production planning tools which control production planning, material resource planning, the work order generation tool 54 which automatically generates part orders, work orders, or supply orders for use in the business applications, etc. Of course, the part order, work order and supply order generation may be completed automatically based on information from the asset utilization expert 50, which decreases the time required to recognize that an asset needs to be fixed as well as the time is takes to receive the parts necessary to provide corrective action with respect to maintenance issues.

The asset utilization expert 50 may also provide information to the maintenance system applications 66, which not only alert maintenance people to problems immediately, but also take corrective measures such as ordering parts, etc. which will be needed to correct a problem. Still further, new models 68 may be generated using types of information that are available to the asset utilization expert 50 but that were previously unavailable to any single system. Of course, it will be understood from FIG. 2 that the asset utilization expert 50 not only receives information or data from the data models and the analysis tools but, also receives information from enterprise resource tools, maintenance tools and process control tools.

Moreover, one or more coordinated user interface routines 58 may communicate with the asset utilization expert 50 as well as any other applications within the plant 10 to provide help and visualization to operators, maintenance persons, business persons, etc. The operators and other users may use the coordinated user interface routines 58 to perform or to implement predictive control, change settings of the plant 10, view help within the plant 10, view alarms or alerts, or perform any other activities related to the information provided by the asset utilization expert 50.

As mentioned above, the asset utilization expert 50 can execute or oversee the execution of one or more mathematical or software models 56 that model the operation of a particular plant or entities within the plant, such as devices, units, loops, areas, etc. These models may be hardware models or they may be process control models. In one embodiment, to generate these models, a modeling expert divides the plant into component hardware and/or process control parts and provides a model for the different component parts at any desired level of abstraction. For example, the model for a plant is implemented in software and is made up of or may include a set of hierarchically related, interconnected models for the different areas of the plant. Similarly, the model for any plant area may be made up of individual models for the different units within the plant with interconnections between the inputs and outputs of these units. Likewise, units may be made up of interconnected device models, and so on. Of course, area models may have device models interconnected with unit models, loop models, etc. In this example model hierarchy, the inputs and outputs of models for the lower level entities, such as devices, may be interconnected to produce models for higher level entities, such as units, the inputs and outputs of which may be interconnected to create still higher level models, such as area models, and so on. The way in which the different models are combined or interconnected will, of course depend on the plant being modeled. While a single, complete mathematical model for the whole plant could be used, it is believed that providing different and independent component models for different portions of or entities within the plant, such as areas, units, loops, devices, etc. and interconnecting these different models to form larger models is useful for a number of reasons. Furthermore, it is desirable to use component models that can be run independently of one another as well as together with other component models as part of a larger model.

While highly mathematically accurate or theoretical models (such as third or fourth order models) may be used for the entire plant or for any or all of the component models, the individual models need not necessarily be as mathematically accurate as possible and could be, for example, first or second order models or other types of models. These simpler models can generally be executed more quickly in software and can be made more accurate by matching the inputs and outputs of the models with actual measurements of inputs and outputs made within the plant in a manner described herein. In other words, the individual models may be tuned or tweaked to accurately model the plant or the entities within the plant based on actual feedback from the plant.

Figure 3:
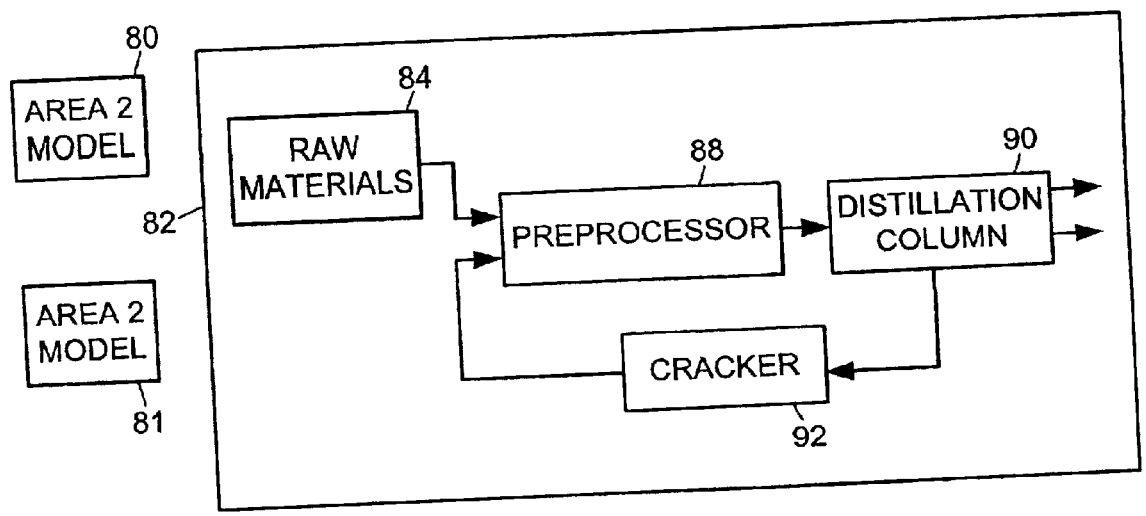
FIG. 3 is a block diagram of a generic model used to simulate the operation of an area within a plant.

The generic use of hierarchical software models will now be described with respect to FIGS. 3 and 4. FIG. 3 illustrates models for multiple areas 80, 81 and 82 within a refining plant. As illustrated in FIG. 3, the area model 82 includes a component model of a raw material source 84 which feeds raw material such as crude oil to a pre-processor model 88. The pre-processor 88 provides some refining to the raw material and provides an output, typically crude oil to a distillation process 90 for further refining. The distillation process 90 outputs $C_2H_4$, usually a desired product, and $C_2H_6$ which, generally speaking, is a waste product. The $C_2H_6$ is fed back to a $C_2$ cracker 92 which provides its output to the pre-processor 88 for further processing. The feedback from the distillation process 90 through the $C_2$ cracker 92 is a recycling process. Thus, the model for the area 82 may include separate models for the raw material source 84, the pre-processor 88, the distillation process 90 and the $C_2$ cracker 92 having inputs and outputs interconnected as illustrated in FIG. 3. That is, each component model may be tied to the inputs and outputs of other component models in the manner illustrated in FIG. 3 to form the model for the area 82. Of course, the models for the other areas 80 and 81 could have other component models having interconnected inputs and outputs.

Figure 4:
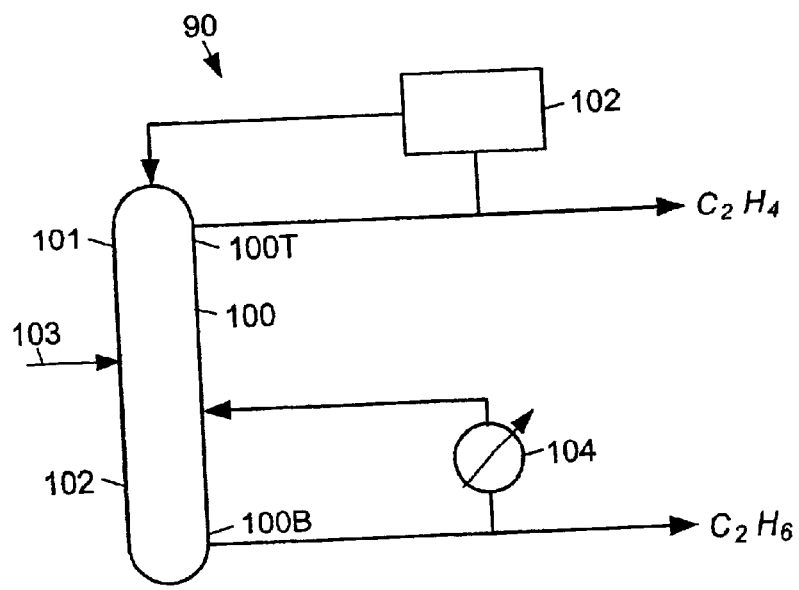
FIG. 4 is a block diagram of a generic model used to simulate the operation of a unit within the area model of FIG. 3.

Referring now to FIG. 4, the component model for the distillation process 90 is illustrated in more detail and includes a distillation column 100 having a top portion 100T and a bottom portion 100B. The input 103 to the distillation column 100 is an indication of pressure and temperature which may be tied to the output of the model for the pre-processor 88 shown in FIG. 3. However, this input could be set by an operator or be set based on actual measured inputs or variables within the plant 10. Generally speaking, the distillation column 100 includes a number of plates disposed therein and fluid moves between the plates during the distillation process. $C_2H_4$ is produced out of the top 100T of the column 100 and a reflux drum 102 feeds back some of this material to the top 100T of the column 100. $C_2H_6$ generally comes out of the bottom of the column 100 and a reboiler 104 pumps polypropylene into the bottom 100B of the column 100 to aid in the distillation process. Of course, if desired, the model for the distillation process 90 may be made up of component models for the distillation column 100, the reflux drum 102 and the reboiler 104, etc. having the inputs and outputs of these models connected as illustrated in FIG. 4 to form the component model for the distillation process 90.

As noted above, the component model for the distillation process 90 may be executed as part of a model for the area 82 or may be executed separately and apart from any other models. In particular, the input 103 to the distillation column 100 and/or the outputs $C_2H_4$ and $C_2H_6$ can actually be measured and these measurements may be used within the model of the distillation process 90 in a number of ways as described below. In one embodiment, the inputs and outputs of the model of the distillation process 90 may be measured and used to determine other factors or parameters associated with the model of the distillation process 90 (such as the distillation column efficiency, etc.) to force the model of the distillation process 90 to more accurately match the operation of the actual distillation column within the plant 10. The model of the distillation process 90 may then be used with the calculated parameters, as part of a larger model, such as an area or plant model. Alternatively or additionally, the model of the distillation process 90 with the calculated parameters may be used to determine virtual sensor measurements or to determine if actual sensor measurements within the plant 10 are in error. The model of the distillation process 90 with the determined parameters may also be used to perform control or asset utilization optimization studies, etc. Still further, component models may be used to detect and isolate developing problems in the plant 10 or to see how changes to the plant 10 might affect the selection of optimization parameters for the plant 10.

If desired, any particular model or component model may be executed to determine the values of the parameters associated with that model. Some or all of these parameters such as efficiency parameters may mean something to an engineer within the context of the model but are generally unmeasurable within the plant 10. More particularly, a component model may be generally mathematically described by the equation $Y=F(X, P)$, wherein the outputs Y of the model are a function of the inputs X and a set of model parameters P. In the example of the distillation column model of the distillation process 90 of FIG. 4, an expert system may periodically collect data (e.g., every hour, every ten minutes, every minute, etc.) from the actual plant indicative of the actual inputs X to and the outputs Y from the entity to which the model pertains. Then, every so often, a regression analysis, such as a maximum likelihood, least squares or any other regression analysis may be performed using the model and multiple sets of the measured inputs and outputs to determine a best fit for the unknown model parameters P based on the multiple sets of measured data. In this manner, the model parameters P for any particular model may be determined using actual or measured inputs and outputs to reconcile the model with the entity being modeled. Of course, this process can be performed for any and all component models used within the plant 10 and can be performed using any appropriate number of measured inputs and outputs. Preferably, the asset utilization expert 50 collects the data associated with the appropriate inputs and outputs for a model over a period of time from the process control network and stores this data for use by the models 56. Then, at the desired times, such as every minute, hour, day, etc., the asset utilization expert 50 may execute the regression analysis using the most recently collected sets of data to determine the best fit for the model parameters using the collected data. The sets of measured input and output data that are used in the regression analysis may be independent of or may overlap with the sets of data used in a previous regression analysis for that model. Thus, for example, a regression analysis for a particular model may be run every hour but may use input and output data collected every minute for the last two hours. As a result, half of the data used in any particular regression analysis may overlap with the data, i.e., is the same as data that was used in a previous regression analysis. This overlapping of data used in the regression analysis provides for more continuity or consistency in the calculation of the model parameters.

Similarly, a regression analysis can be performed to determine if sensors making measurements within the process 10 are drifting or have some other error associated therewith. Here, the same data or potentially different data pertaining to the measured inputs and outputs of the entity being modeled are collected and stored by, for example, the asset utilization expert 50. In this case, the model can be generally mathematically expressed as $Y+dY=F(X+dX, P)$, wherein dY are the errors associated with the measurements of the outputs Y, and dX are the errors associated with measurements of the inputs X. Of course, these errors could be any types of errors, such as bias, drift, or non-linear errors and the model may recognize that the inputs X and outputs Y may have different kinds of errors associated therewith, with the different kinds of possible errors having different mathematical relationships to the actual measured values. In any event, a regression analysis, such as a maximum likelihood, least squares or any other regression analysis may be performed using the model with the measured inputs and outputs to determine a best fit for the unknown sensor errors dY and dX. Here, the model parameters P may be based on the parameters P calculated using a previous regression analysis for the model, or may be treated as further unknowns and may be determined in conjunction with this regression analysis. Of course, as the number of unknowns used within regression analysis increases, the amount of data required increases and the longer it takes to run the regression analysis. Furthermore, if desired, the regression analysis for determining the model parameters and the regression analysis for determining the sensor errors may be run independently and, if desired, at different periodic rates. This different periodicity may be beneficial when, for example, the time frame over which measurable sensor errors are likely to occur is much different, either greater than or less than, the time frame over which changes in the model parameters are likely to occur.

In any event, using these component models, the asset utilization expert 50 can perform asset performance monitoring by plotting the values of the determined model parameter(s) (and/or model inputs and outputs) versus time. Still further, the asset utilization expert 50 can detect potentially faulty sensors by comparing the determined sensor errors dY and dX to thresholds. If one or more of the sensors appears to have a high or an otherwise unacceptable error associated therewith, the asset utilization expert 50 can notify a maintenance person and/or a process control operator of the faulty sensor.

It will be understood from this discussion that the component models may be executed independently for different purposes at different times and, in many cases, may be executed periodically to perform the above described performance monitoring activities. Of course, the asset utilization expert 50 can control the execution of the appropriate models for the appropriate purposes and use the results of these models for asset performance monitoring and optimization. It will be understood that the same model may be run by the asset utilization expert 50 for different purposes and for calculating different parameters or variables associated with the model.

As noted above, the parameters, inputs, outputs or other variables associated with any particular model may be stored and tracked to provide performance monitoring for a device, a unit, a loop, an area or any other entity of a process or a plant. If desired, two or more of these variables may be tracked or monitored together to provide a multi-dimensional plot or measure of the performance of the entity. As part of this performance modeling, the location of the parameters or other variables within this multi-dimensional plot may be compared to thresholds to see if the entity, as defined by the coordinated parameters being monitored, is within a desired or acceptable region or is, instead, outside of that region. In this manner, the performance of an entity may be based on one or more parameters or other variables associated with that entity.

It will be understood that the asset utilization expert 50 can monitor one or more entities using the monitoring technique described above based on model parameters or other model variables and can report the operating states or performance measures of these entities to any other desired persons, functions or applications within the process control plant 10, such as to a process control expert system, a maintenance person, a business application, a user interface routine 58, etc. Of course, it will also be understood that the asset utilization expert 50 may perform performance or condition monitoring on any desired entity, based on one, two, three or any other desired number of parameters or variables for each entity. The identity and number of variables or parameters to be used in this performance monitoring will generally be determined by an expert familiar with the process and will be based on the type of entity being monitored.

In one particular example, the asset utilization expert 50 can be implemented as a monitoring routine to use data from various sources to detect or predict the occurrence of cavitations within or associated with a pump within a process plant. Generally speaking, cavitation is defined as the phenomenon that occurs when the local absolute static pressure of a fluid, somewhere in the flow, drops below the vapor pressure of the fluid which leads to the temporary formation of vapor bubbles. As the bubbles are convected down stream in the flow, they reach a location where the pressure increases again above the vapor pressure. At this point, the bubbles collapse and create a sudden, very high pressure pulse which can damage the material of a nearby flow passage wall, impeller, etc. The onset of cavitation, i.e., the first appearance of vapor bubbles, depends primarily on the vapor pressure of the liquid.

In pumps, such as impeller type pumps, classical cavitation occurs when the absolute pressure of the moving liquid is reduced to be equal to or even below the vapor pressure of the liquid at, for example, the eye of the pump impeller. Bubbles are formed as a result of this pressure drop, with the lower pressures being caused at the eye of the impeller by variations in the velocity of the fluid and friction losses as the fluid enters the impeller. The bubbles are caught up and swept outward from the impeller along the impeller vane. Thereafter, somewhere along the impeller vane, the liquid pressure exceeds the vapor pressure, which causes the bubbles to collapse. Implosions of these vapor pockets can be so rapid that a rumbling/cracking noise is produced. In fact, it actually sounds like rocks passing through the pump.

Cavitation has several effects on a centrifugal pump. First, as indicated above, the collapsing bubbles make a distinctive noise, which has been described as a growling sound, or a sound like the pump is pumping gravel. Operators currently detect the presence of cavitation in a process plant by walking through the plant and listening for this distinctive sound. Moreover, the hydraulic impacts caused by the collapsing bubbles are strong enough to cause minute areas of fatigue on the metal impeller surfaces or pump walls, which reduces the long term life and efficiency of the pump. An even more serious effect of cavitation is the mechanical damage which can occur due to excessive vibration of the pump. Also, depending on the severity of the cavitation, the pump performance drops below its expected performance, referred to as break away, producing a lower than expected head (pressure) and/or flow.

There are a couple of different types of cavitation including suction cavitation, discharge cavitation and recirculation cavitation. Suction cavitation occurs when the net positive suction head available to the pump (i.e., upstream pressure) is less than what is required as defined by the pump manufacturer. Symptoms of suction cavitation include the pump sounding as if it is pumping rocks, a high vacuum reading on the suction line, a low discharge pressure and/or a high flow rate on the discharge side of the pump. Suction cavitation may be caused by a clogged suction pipe, the suction line being too long or having a diameter that is too small, the suction lift being too high or a valve on the suction line (i.e., upstream of the pump) being only partially open.

Discharge cavitation occurs when the pump discharge head or pressure is too high when the pump runs at or near shutoff. Symptoms of discharge cavitation include the pump sounding like it is pumping rocks, a high discharge gauge reading and/or low flow on the discharge side of the pump. Some common causes of discharge cavitation include a clogged discharge pipe, the discharge pipe being too long or too small in diameter, the discharge static head being too high or a discharge line valve (i.e., downstream of the pump) only being partially open.

Recirculation cavitation (also called rotating stall or separation), which is the least understood but probably the most common type of cavitation, occurs when vapor filled pockets occur within the line.

As indicated above, cavitation is typically detected manually by an operator walking around and listening for the distinctive sound of cavitation within the plant. However, this method of detection is tedious, time consuming and not very fast or effective. To overcome this problem, a cavitation monitoring system may automatically detect, estimate or predict the presence (or absence) of cavitation by combining various data measured in or associated with a plant. Such a cavitation monitoring system is described herein with respect to an example process control loop 200 illustrated in FIG. 5. The process control loop 200 includes a tank 202 which provides liquid via a pump 204 to another tank 206. In this example, an output valve 208 associated with the tank 202 is located upstream of the pump 204 and an input valve 210 for the tank 206 is located downstream of the pump 204. A pressure sensor (transmitter) 212 and a flow sensor (transmitter) 214 are also located upstream of the pump 204 to measure suction pressure at the pump 204 and the flow rate of fluid into the pump 204. Likewise, a pressure sensor 216 and a flow sensor 218 are located downstream of the pump 204 to measure discharge pressure and flow rate of the pump 204.

When the output valve 208 and the input valve 210 are opened, the pump 204 operates to pump fluid from the tank 202, through the valve 210 to the second tank 206 which may be, for example a mixing tank. If desired, an output valve 220 may be used to empty the tank 206 and a pressure or flow sensor 221 and a level sensor 222 may be used to gauge the flow from the tank 206 and the level of liquid within the tank 206, respectively. A controller 223 may receive the output of the level sensor 222 and control a process loop to open or close the valve 220. Furthermore, a controller 224 obtains feedback from the valve 210 and the flow sensor 218 to perform process control functions related to opening the valve 210 as well as possibly other actions.

A cavitation monitoring system or computer 225, having a processor 226 and a memory 227, is configured to receive data pertaining to one or more of the flow parameters, such as the suction pressure or flow rate and the discharge pressure or flow rate measured by the sensors/transmitters 212, 214, 216, and 218. The monitoring system 225 may be a maintenance system, such as the AMS system sold by Rosemount, Inc., may be a control system, may be a centralized or decentralized monitoring computer, or may be any other desired computer. In one embodiment, the monitoring system 225 may be connected to or may be part of the asset utilization system 50 described above. In any event, the monitoring system 225 includes a collection or communication routine 228 stored in the memory 227 and adapted to be executed on the processor 226 to receive operating data from various data sources such as from the sensors 212, 214, 216, 218. A monitoring routine 229, which is also stored in the memory 227 and adapted to be executed on the processor 226, uses the collected data to determine whether or not cavitation is likely to be occurring within the pump 204, i.e., to detect or predict the occurrence of cavitations within the pump 204. Thus, while the loop 200 is generally known, as are the steps of collecting data pertaining to the various elements or devices within the loop, it is possible, using the monitoring system 225 to detect and predict the occurrence of cavitations within the process control loop 200.

Figure 6:
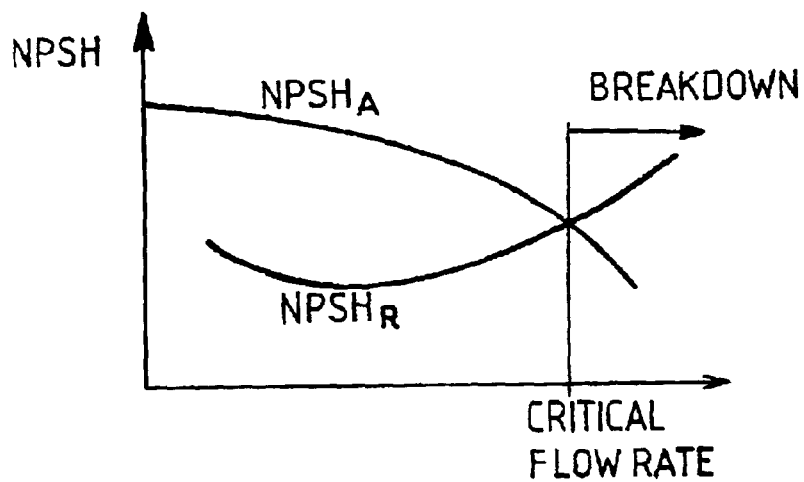
FIG. 6 is a graph illustrating the relationship between NPSHa, NPSHr and cavitation.

Before describing a specific manner of detecting and predicting pump cavitations in more detail, there are a couple of important factors that affect or are related to cavitation within a pump disposed, for example, within a fluid line. In analyzing a pump to determine if cavitation is likely, there are two aspects of NPSH (Net Positive Suction Head) which must be considered. First, NPSHa (Net Positive Suction Head available) is the suction head present at the pump suction orifice over and above the vapor pressure of the liquid. NPSHa is a function of the suction system and is independent of the type of pump in the system.

$$NPSHa = P + H - Hf - Hvp$$

where:
P=Absolute pressure
H=Static distance from the surface of the liquid to the pump impeller
Hf=Friction loss
Hvp Vapor pressure NPSHr (Net Positive Suction Head required) is the suction head required at the impeller centerline over and above the vapor pressure of the liquid to prevent cavitation. NPSHr is strictly a function of the pump inlet design, and is independent of the suction piping system. NPSHr is established by the manufacturer using a special test, and the value of NPSHr is shown on a manufacturer pump curve as a function of pump capacity. In order for a pump to be operating free of cavitation, NPSHa must be greater than NPSHr. The interplay of NPSHa and NPSHr is illustrated in the graph of FIG. 6 in which NPSHa and NPSHr are plotted versus flow rate. The graph of FIG. 6 illustrates that, at the point where NPSHa becomes less than NPSHr, cavitation or breakdown begins to occur. Because the flow rate of a fluid changes the pressure of that fluid, NPSHa and NPSHr are dependent on flow rate.

When a manufacturer develops a new pump, it is tested under controlled conditions and the results of these tests are plotted as one or more curves on what are commonly known as performance charts. Generally speaking, pump manufacturers determine the NPSHr of an impeller pattern by conducting one or more suppression tests using water as the pumped fluid. The result of these suppressions tests is one or more curves defining the NPSHr of the pump at different flow rates (for water). These tests are usually only made on the first casting for an impeller pattern and not on individual pumps. Thus, these curves may not take into effect characteristics of individual impellers, such as manufacturing differences or flaws, and are most accurate for water, as opposed to other fluids. Further, the NPSHr plotted on the tradition pump curves is based on a three percent head loss due to cavitation, a convention established many years ago in the Hydraulic Institute Standards. Permitting this large of a head loss means that the cavitation would already have been occurring at some higher flow condition before performance loss was noted.

Figure 7:
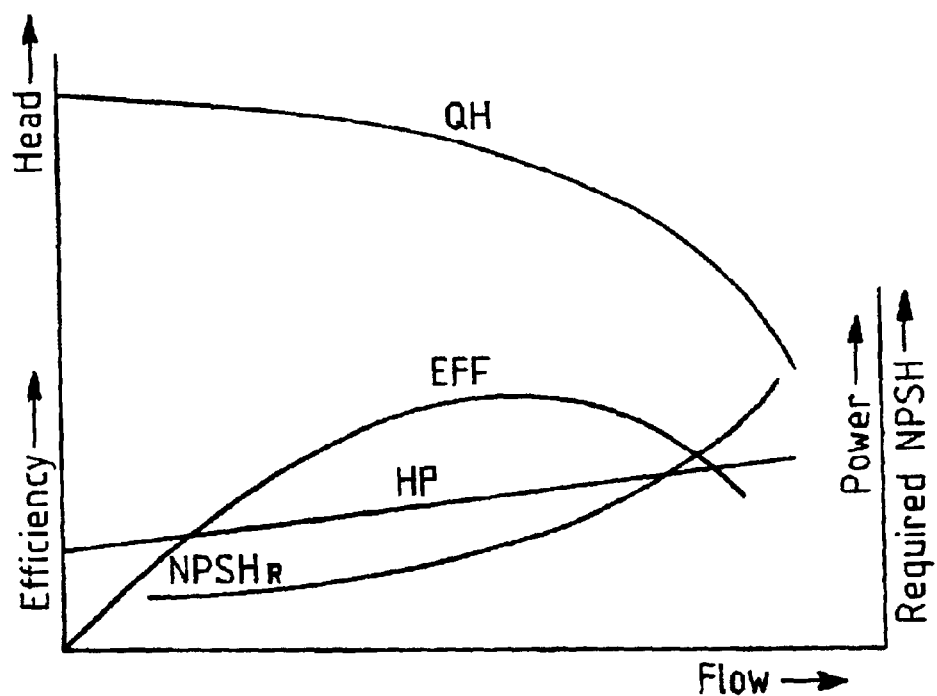
FIG. 7 is an example set of manufacturer characteristic curves for a pump.

FIG. 7 illustrates a typical performance chart or set of manufacturer curves for a pump. Here, the curve marked QH shows how the developed head changes with the flow rate. The curve marked HP represents the power consumed at different flows, and the curve marked EFF shows the ratio between the actual amount of power added to the liquid and the power consumed by the pump at the given flow rate. This performance chart also shows the minimum head required at the suction nozzle of the pump to avoid cavitation which is marked as NPSHr. By viewing the relation between these curves, it is evident that cavitation within the pump causes a reduction in efficiency as well as head developed within the pump.

Generally speaking, the first reaction to a cavitation problem is usually to check the NPSHa at the eye of the impeller and to then compare this pressure with the NPSHr determined for the actual flow rate in the impeller design. The ratio of the NPSHa to NPSHr must be sufficiently large (and at least greater than one) to prevent the formation of cavitation bubbles.

Figure 5:
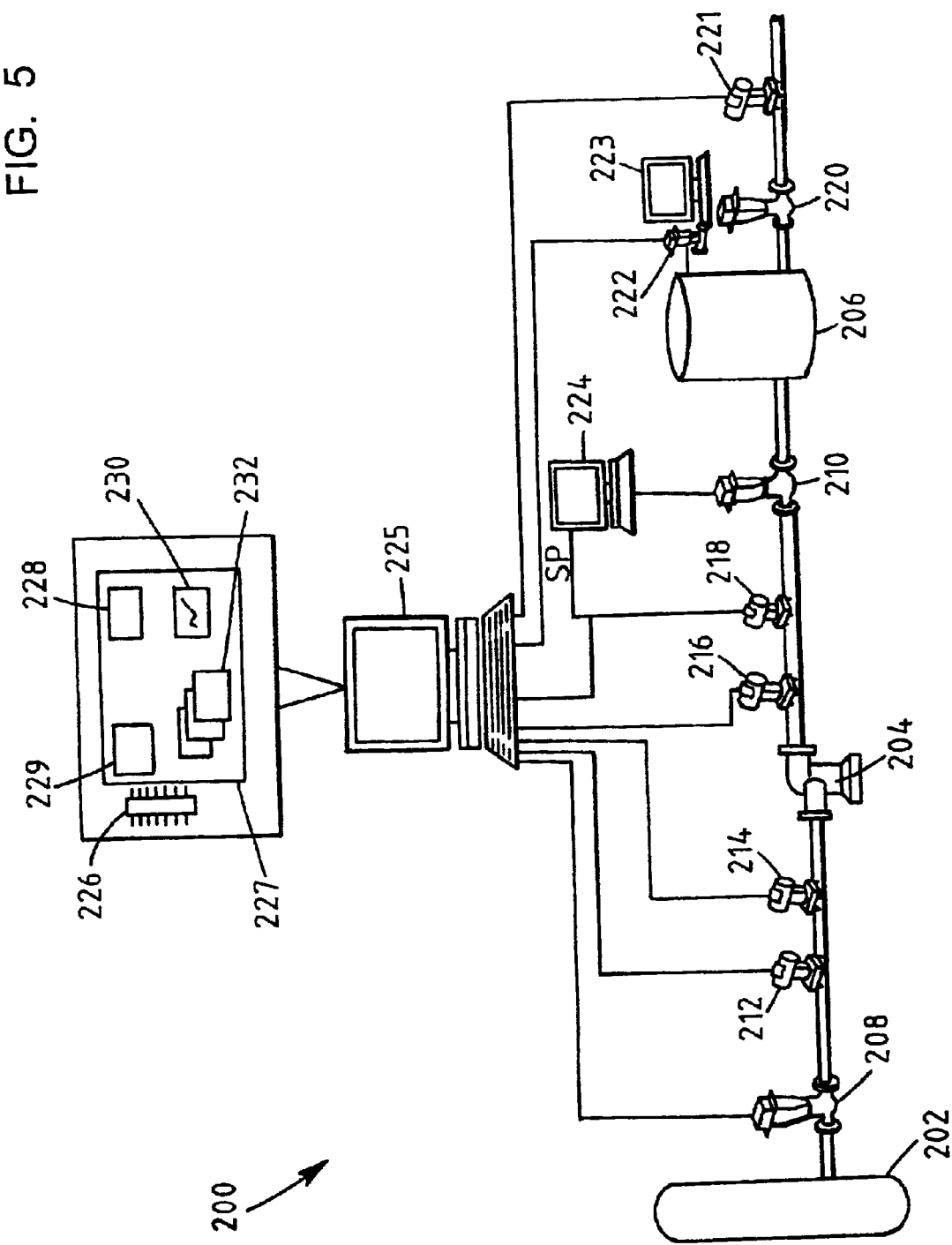
FIG. 5 is a block diagram of a monitoring system connected within a process control loop, the monitoring system being capable of detecting cavitation at or near a pump located within the control loop.

One way to detect or predict the occurrence of cavitation within a pump or a control loop using a pump, such as in the system of FIG. 5, is to obtain and store one or more characteristic curves for the pump 204 within the monitoring system 225 and use these curves along with process measurements, such as flow rate and suction pressure, to determine if cavitation is occurring. In the system of FIG. 5, the characteristic curves are illustrated as-being stored in the memory 227 of the monitoring system 225. In this case, the collection routine 228 collects and stores one or more operating parameters, such as the flow rate and pressure within the pump 204 as measured by, for example, the sensors 212, 214, 216 or 218. The monitoring routine 229 uses the measured suction flow rate (or the discharge flow rate) from the flow sensors 212 or 218 to determine the NPSHr from the stored characteristic curve 230 or any modified curves created for a particular fluid or pump being used. Thereafter, the monitoring routine 229 the estimate the NPSHa from the measurements of suction pressure or discharge pressure produced by the pressure sensors 214 or 216, and can then calculate the ratio of NPSHa to NPSHr. Next, if desired, the monitoring routine 229 can compare this ratio to a predetermined threshold, such as one. If this ratio is close to one or less than one, then cavitation is probably occurring within the pump. However, if the ratio is greater than one, cavitation is probably not occurring. Of course, a ratio of around one means that cavitation may or may not be occurring (depending on how well the pump follows the characteristic curve and how well the NPSHa has been estimated or measured, etc.) but that the pump is operating close to the boundary of the formation of cavitation. Of course, the monitoring routine can compare the NPSHa and the NPSHr in any other desired manner to see if NPSHa is greater than NPSHr.

If cavitation is detected, the monitoring routine 229 may alert an operator or maintenance person to inform this person of the problem. The monitoring routine 229 may make recommendations for corrections or potential causes of the cavitation problem depending on the type or nature of cavitation being detected. Of course, the type of cavitation may be determined based on pressure and flow measurements made upstream as well as downstream of the pumps from the sensors 212, 214, 216, and 218 as well as other sensors.

In another example, where, for example, suction or discharge pressure cannot be measured directly or where measurements of these values do not correlate directly with NPSHa, the monitoring system 225 may use one or more models 232 of the pump 204 stored in the memory 227 to detect the existence of cavitation or to predict the occurrence of cavitation. Here, the monitoring routine 229 uses the models 232, along with appropriate operational parameters to model the control loop 200 and, in particular, the pump 204. Of course, a generic model of the pump 204 can be used and this generic model can be updated or calibrated with actual pump data as measured from the actual pump 204 or the control loop 200 and with performance curves from the pump manufacturer, to produce a better or more accurate model of the pump 204. The models 232 may be used to estimate or model the operating parameters, such as the actual pressures and flows within a device, such as the pump 204, that may potentially be experiencing cavitation. Such models may be implemented and updated as generally described above. In this case, NPSHa and/or flow rates may be estimated from the process models and these estimated values may be used, along with the characteristic curves, to determine whether cavitation is or is likely to be occurring within the pump 204.

Similarly, to predict future pump cavitations, the models 232 of the process control loop 200 or the pump 204 may be implemented based on expected or predicted process conditions to estimate future behavior of the pump 204 or the control loop 200 to thereby determine pressures and flow rates at or near the pump 204 at some point in the future. These predicted pressure and flow rates may then be used, along with the characteristic curves 230 for the pump 204 to determine if the pump 204 will cavitate in expected future conditions or to determine when the pump 204 will start to cavitate. Such data can be used in optimization routines, control routines, etc. to predict and prevent pump cavitation situations. In a similar manner, the monitoring routine 229 may use a trending analysis, such as collecting past data related to flow rates and NPSHa within the pump 204 to determine when and under what conditions the pump 204 will cavitate and alert the user to such problems before they occur or at the time they are likely to occur based on process control feedback data.

In yet another method of detecting pump cavitation, the monitoring routine 229 looks for changes in performance of the pump 204, based on measured operating parameters, characteristic curves, etc., to detect the onset of cavitation. This method may be useful when NPSHa is not directly measurable in a normally operating pump and is based on the assumption that the direct consequence of cavitation is a degradation in the operational performance of the pump. The reason for this reduced performance, it is believed, is that the cavitation bubbles change the impedance or load of the pump, which in turn affects the operating curve of the pump. This shift in the operating curve or the change of the pump impedance has a direct impact on pump's electrical loop, specifically the V-A (voltage-current) characteristic. It should be possible, therefore, for the monitoring routine 229 to determine the existence of cavitation in a pump by monitoring the V-A relation of the pump.

Figure 8:
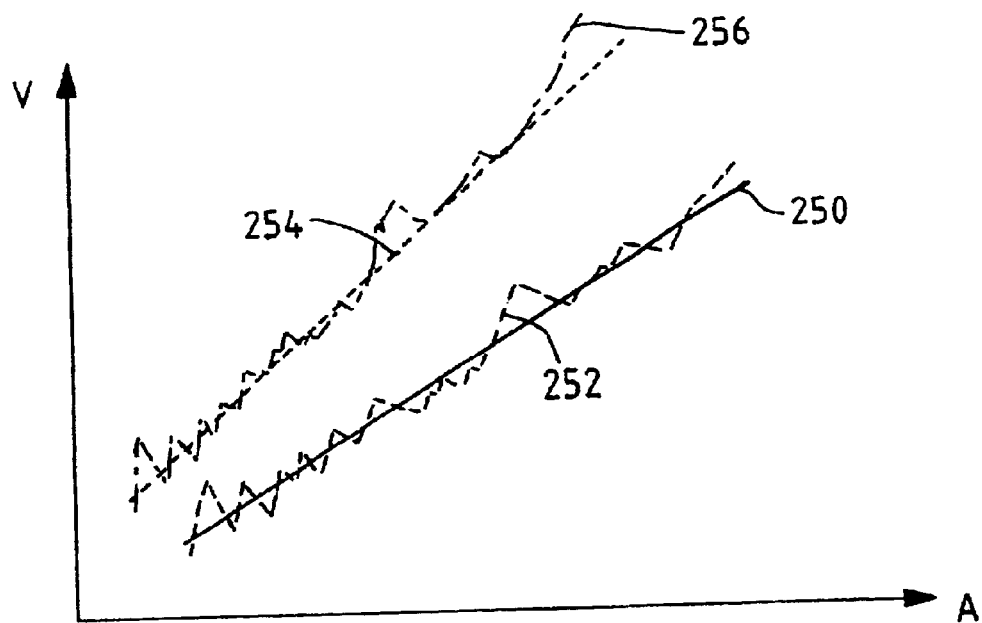
FIG. 8 is a graph illustrating a normal V-A curve for pump with and without high frequency noise as well as a shifted V-A curve with and without high frequency noise, which may result from cavitation within a pump.

FIG. 8 illustrates an example V-A characteristic curve 250 of a normally operating pump, i.e., without cavitation. A similar characteristic curve of a normally operating pump in the presence of high frequency fluctuations is illustrated as the curve 252. Shifted V-A characteristic curves without high frequency fluctuations 254 and with high frequency fluctuations 256 are also illustrated in FIG. 8. The monitoring routine 229 may detect the voltage and current operational parameters of the pump 204, such as through any known maintenance routine which measures these values, and track the actual V-A curve or operating point of the pump 204. The monitoring routine 229 may then, using for example any desired probability measure, determine if the pump 204 is operating on the normal characteristic curve or on a shifted characteristic curve associated with the operation of the pump 204 undergoing cavitation. If the pump 204 is operating on a shifted curve, the monitoring routine 229 detects that the pump 204 is undergoing cavitation. Alternatively, to detect the presence of cavitation, the monitoring routine 229 may use a deterministic indicator of cavitation in V-A curve of the pump 204 by looking at the absolute shift of the curve, the high frequency fluctuation in the curve or a combination of these. While the absolute shift of the V-A curve is easy to detect, this feature may not be a very reliable indicator of cavitation because other factors could shift the V-A curve as well. The high frequency fluctuation of the V-A curve can be analyzed in frequency domain using any desired technique. In the simplest case, the cavitation may only occur in certain frequency region(s). Here, threshold and filtering techniques can be applied efficiently and reliably to detect the presence of cavitation.

If no distinct frequency regions can be found that are exclusively related to cavitation, the monitoring routine 229 may use other advanced tools, such as expert engines like neural networks, or fractal analysis techniques or a combination of these.

While the monitoring routine 229 has been described as being implemented in a separate computer, such as that associated with a maintenance system, the monitoring routine 229 could be located in any desired computer, such as in a controller, a user interface (like any of those illustrated in FIG. 1), etc., and could receive the operational data in any desired manner. Still further, the monitoring routine 229 and associated characteristic curves 230 and pump models 232 could be located in a field device, such as in the pump 204 itself, assuming that the pump 204 is a smart field device including a processor or other computing mechanism.

Figure 9:
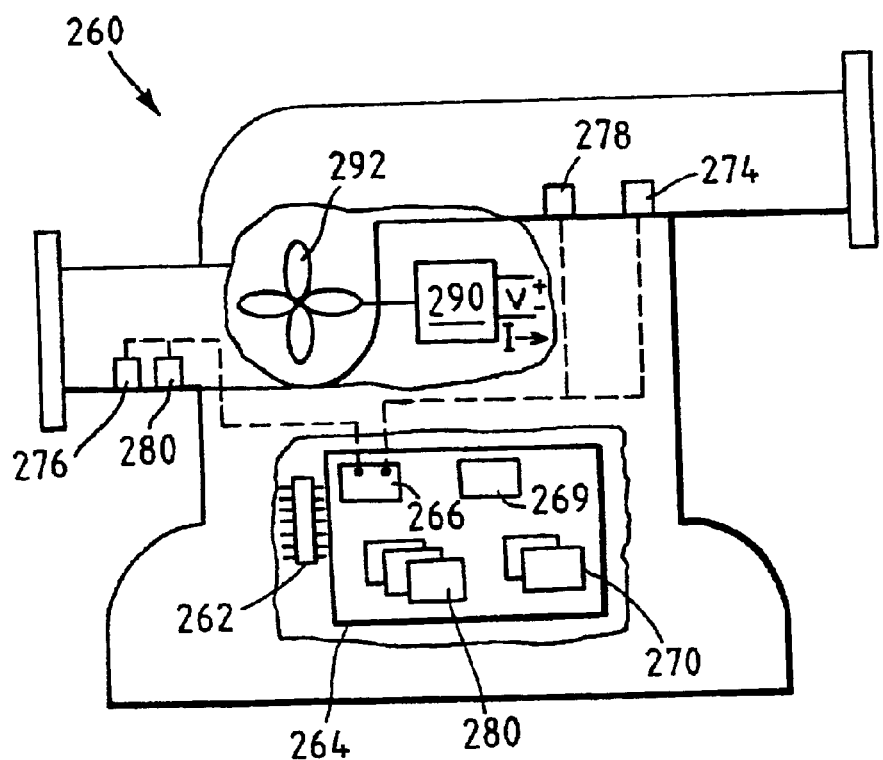
FIG. 9 is a partially cut-away diagram of a pump having a cavitation monitoring routine disposed therein.

FIG. 9 illustrates a field device in the form of a pump 260 which can detect the presence of cavitation. In this case, the pump 260 includes a processor 262 and a memory 264 that stores a data collection routine 266, a monitoring routine 269 and one or more characteristic curves 270 for the pump 260. Further, the pump 260 may include a flow rate sensor (274 or 276) and a pressure sensor (278 or 280) on one or both of the suction and discharge sides of the pump 260. These sensors may provide outputs to the collection routine 266. The collection routine 266 could, instead, receive the flow and/or pressure data from other sensors within the plant using any desired communication protocol or technique. Using the collected data, the monitoring routine 269 can operate as described above to detect the presence of cavitation.

Alternatively, or in addition, the pump 260 can include and implement one or more models 280, trending analysis and expert engines which can be used as discussed above to estimate the conditions within the pump 260 to thereby detect cavitation. Such expert systems may include model based expert systems, neural networks, fractal analysis systems, data mining systems, trending systems, fuzzy logic systems, or any other suitable expert system which collects data from the process and uses that data to detect cavitation. The pump 260 could, upon detecting cavitation or conditions which are leading to cavitation, send an error or alert message to an operator, maintenance person or other person to inform that person of the existence or possible existence of cavitation.

Similarly, the pump 260 may include a motor 290 coupled to an impeller 292 or any other desired pump mechanism, the operation of which forces fluid through the pump 260. The collection routine 266 may collect or acquire data pertaining to the voltage and current operational parameters of the pump and use this data, as discussed above, to determine the existence of cavitation within the pump 260.

While the cavitation monitoring techniques described above typically use a characteristic curve associated with a device, this curve take any form, such as those illustrated herein, or may simply be a trending analysis, a data plot, a neural network, or other description of the operation of the pump. Likewise, this curve may, in some cases, include only a single point or, in other cases, include many points. As a result, the characteristic curve discussed herein is not limited to the curves illustrated in FIGS. 6, 7 and 8.

While the asset utilization expert 50, monitoring routines 229 and 269 and other process elements have been described as preferably being implemented in software, they may be implemented in hardware, firmware, etc., and may be implemented by any other processor associated with the process control system 10. In any event, however, the recitation of a routine stored in a memory and executed on a processor includes hardware and firmware devices as well as software devices. For example, the elements described herein may be implemented in a standard multipurpose CPU or on specifically designed hardware or firmware such as an application-specific integrated circuit (ASIC) or other hard-wired device as desired and still be a routine executed in a processor. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process control plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A monitoring system for use un estimating the existence of cavitation in a device, the monitoring system comprising:

a processor;

a memory that stores a characteristic curve for the device;

a collection routine adapted to be executed on the processor to collect one or more operating parameters associated with the device during operation of the device;

a monitoring routine adapted to be executed on the processor that uses the one or more operating parameters and the characteristics curve to estimate the presence of cavitation within the device; and wherein the monitoring routine is adapted to determine a net positive suction head available in the device and compare the net positive suction head available with a net positive suction head required associated with the device.

2. The monitoring system of claim 1, wherein the monitoring routine is further adapted to calculate the ratio of the net positive suction head available and the net positive suction head required for the device and to compare the ratio to a predetermined threshold.

3. A monitoring system for use un estimating the existence of cavitation in a device, the monitoring system comprising:

a processor;

a memory that stores a characteristic curve for the device;

a collection routine adapted to be executed on the processor to collect one or more operating parameters associated with the device during operation of the device;

a monitoring routine adapted to be executed on the processor that uses the one or more operating parameters and the characteristics curve to estimate the presence of cavitation within the device; and wherein the characteristic curve defines a net positive suction pressure required for the device.

4. A monitoring system for use un estimating the existence of cavitation in a device, the monitoring system comprising:
- a processor;
- a memory that stores a characteristic curve for the device;
- a collection routine adapted to be executed on the processor to collect one or more operating parameters associated with the device during operation of the device;
- a monitoring routine adapted to be executed on the processor that uses the one or more operating parameters and the characteristics curve to estimate the presence of cavitation within the device; and
- wherein the characteristic curve is a voltage-current characteristic curve for the device, wherein the one or more operating parameters are associated with electrical operating parameters of the device and wherein the monitoring routine is adapted to use the electrical operating parameters of the device to detect whether the device is operating in accordance with the voltage-current characteristic curve of the device.

5. The monitoring system of claim 4, wherein the voltage-current characteristic curve is a voltage-current characteristic curve for the device operating without cavitation.

6. The monitoring system of claim 4, wherein the voltage-current characteristic curve is a voltage-current characteristic curve for the device operating without cavitation.

7. The monitoring system of claim 4, wherein the voltage-current characteristic curve is a voltage-current characteristic curve for the device including high frequency fluctuations.

8. A field device for use in a process plant, the field device comprising:
- a processor;
- a memory;
- a collection routine stored in the memory and adapted to be executed on the processor to collect one or more operating parameters associated with the process plant operation;
- a monitoring routine stored in the memory an adapted to be executed on the processor to use the one or more operating parameters to estimate the presence of cavitation in the process plant;
- wherein the monitoring routine is adapted to use the operating parameters to detect a degradation in the operational performance of a device in the process plant to estimate the presence of cavitation within the process plant, a characteristic curve associated with the device is stored in the memory, and the monitoring routine is adapted to detect the degradation in performance based on the characteristic curve; and
- wherein the characteristic curve is a voltage-current curve.

9. A field device for use in a process plant, the field device comprising:
- a processor;
- a memory;
- a collection routine stored in the memory and adapted to be executed on the processor to collect one or more operating parameters associated with the process plant operation;
- a monitoring routine stored in the memory and adapted to be executed on the processor to use the one or more operating parameters to estimate the presence of cavitation in the process plant;
- wherein the monitoring routine is adapted to use the operating parameters to detect a degradation in the operational performance of a device in the process plant to estimate the presence of cavitation within the process plant, a characteristic curve associated with the device is stored in the memory, and the monitoring routine is adapted to detect the degradation in performance based on the characteristic curve; and
- wherein the characteristic curve defines a net positive suction head required for the device.

10. The field device of claim 9, wherein the monitoring routine is adapted to determine a net positive suction head available within the device from the operating parameters and to compare the net positive suction head available and net positive suction head required to estimate the existence of cavitation within the device.

11. A method of detecting cavitation within a device operating in a process, the method comprising:
- collecting one or more operating parameters associated with the device during operation of the device;
- storing a characteristic curve for the device; and
- automatically detecting the presence of cavitation within the device based on the one or more collected operating parameters wherein the step of automatically detecting includes the step of using the characteristic curve and alerting an operator to the presence of cavitation within the device;
- wherein the step of automatically detecting includes the steps of determining a net positive suction head available in the device and comparing the net positive suction head available with a net positive suction head required for the device.

12. The method of claim 11, wherein the step of automatically detecting further includes the step of calculating the ratio of the net positive suction head available and the net positive suction head required for the device and comparing the ratio to a predetermined threshold.

13. A method of detecting cavitation within a device operating in a process, the method comprising:
- collecting one or more operating parameters associated with the device during operation of the device;
- storing a characteristic curve for the device; and
- automatically detecting the presence of cavitation within the device based on the one or more collected operating parameters wherein the step of automatically detecting includes the step of using the characteristic curve and alerting an operator to the presence of cavitation within the device;
- wherein the step of storing a characteristic curve includes the step of storing a characteristic curve that defines a net positive suction head required for the device.

14. A method of detecting cavitation within a device operating in the process, the method comprising:
- collecting one or more operating parameters associated with the device during operation of the device;
- storing a characteristic curve for the device; and
- automatically detecting the presence of cavitation within the device based on the one or more collected operating parameters wherein the step of automatically detecting includes the step of using the characteristic curve and alerting an operator to the presence of cavitation within the device;
- wherein the step of storing the characteristic curve includes the step of storing a voltage-current characteristic curve for the device, wherein the step of collecting includes the step of collecting one or more electrical operating parameters of the device and wherein the step of automatically detecting includes the step of using the electrical operating parameters of the device to detect whether the device is operating in accordance with the voltage-current characteristic curve of the device.

15. A monitoring system for use in detecting the presence of cavitation within a device in a plant having a processor, the monitoring system comprising:

a memory;

a collection routine stored in the memory and adapted to be executed in the processor to collect one or more operating parameters associated with the device during operation of the device; and a monitoring routine stored in the memory and adapted to be executed on the processor to use the one or more operating parameters to estimate the presence of cavitation within the device;

wherein a characteristic curve associated with the device is stored in the memory, and the monitoring routine is adapted to detect the degradation in performance based on the characteristic curve and to alert an operator to the presence of cavitation within the device and wherein the characteristic curve is a voltage-current curve.

16. A monitoring system for use in detecting the presence of cavitation within a device in a plant having a processor, the monitoring system comprising:

a memory;

a collection routine stored in the memory and adapted to be executed on the processor to collect one or more operating parameters associated with the device during operation of the device; and a monitoring routine stored in the memory and adapted to be executed on the processor to use the one or more operating parameters to estimate the presence of cavitation within the device;

wherein a characteristic curve associated with the device is stored in the memory, and the monitoring routine is adapted to detect the degradation in performance based on the characteristic curve and to alert an operator to the presence of cavitation within the device and wherein the characteristic curve defines a net positive suction head required for the device.

17. The monitoring system of claim 16, wherein the monitoring routine is adapted to determine a net positive suction head available within the device from the operating parameters and to compare the net positive suction head available and the net positive suction head required to estimate the presence of cavitation within the device.

* * * * *

UNITED STATES PATENT AND TRADEMARK OFFICE
CERTIFICATE OF CORRECTION

PATENT NO. : 6,954,713 B2  Page 1 of 1
APPLICATION NO. : 10/044154
DATED : October 11, 2005
INVENTOR(S) : Evren Eryurek It is certified that error appears in the above-identified patent and that said Letters Patent is hereby corrected as shown below:

At Column 6, line 13, please delete "other" immediately after "or"
At Column 7, line 17, please delete "to" immediately after "with"
At Column 19, line 8, please delete "as-being" and insert --as being--
At Column 21, line 55, please insert --may-- immediately after "curve"

In Claim 1, Column 22, line 30, please delete "un" and insert --in--
In Claim 1, Column 22, line 41, please delete "characteristics" and insert --characteristic--
In Claim 3, Column 22, line 53, please delete "un" and insert --in--
In Claim 3, Column 22, line 64, please delete "characteristics" and insert --characteristic--
In Claim 4, Column 23, line 1, please delete "un" and insert --in--
In Claim 4, Column 23, line 12, please delete "characteristics" in insert --characteristic--
In Claim 6, Column 23, line 27, please delete "without" and insert --with--
In Claim 15, Column 25, line 13, please delete "in" and insert --on--

Signed and Sealed this

Nineteenth Day of June, 2007

JON W. DUDAS
*Director of the United States Patent and Trademark Office*